US012744607B2

(12) United States Patent
Wang et al.

(10) Patent No.: US 12,744,607 B2
(45) Date of Patent: Sep. 22, 2026

(54) BEAM DOMAIN CHANNEL MODELING METHOD FOR ORBITAL ANGULAR MOMENTUM WIRELESS COMMUNICATION

(71) Applicants: Southeast University, Nanjing (CN); PURPLE MOUNTAIN LABORATORIES, Nanjing (CN)

(72) Inventors: Chengxiang Wang, Nanjing (CN); Wenxie Ji, Nanjing (CN); Jie Huang, Nanjing (CN); Yue Yang, Nanjing (CN); Chen Huang, Nanjing (CN)

(73) Assignees: SOUTHEAST UNIVERSITY, Nanjing (CN); PURPLE MOUNTAIN LABORATORIES, Nanjing (CN)

( * ) Notice: Subject to any disclaimer, the term of this patent is extended or adjusted under 35 U.S.C. 154(b) by 0 days.

(21) Appl. No.: 18/782,376

(22) Filed: Jul. 24, 2024

(65) Prior Publication Data

US 2025/0038868 A1 Jan. 30, 2025

(30) Foreign Application Priority Data

Jul. 26, 2023 (CN) ......................... 202310924281.9

(51) Int. Cl.

*H04B 17/391* (2015.01)
*H04B 7/0426* (2017.01)
*H04L 5/00* (2006.01)

(52) U.S. Cl.

CPC ......... *H04B 17/3912* (2015.01); *H04B 7/043* (2013.01); *H04L 5/0023* (2013.01)

(58) Field of Classification Search

CPC .. H04B 17/3912; H04B 7/043; H04B 7/0617; H04B 7/063; H04B 7/086; H04B 7/22; H04L 5/0023; Y02D 30/70

(Continued)

(56) References Cited

U.S. PATENT DOCUMENTS

2022/0345232 A1* 10/2022 Orhan ................. H04B 7/0695

OTHER PUBLICATIONS

Wang, Jun et al. "A Novel 3D Non-Stationary GBSM for 6G THz Ultra-Massive MIMO Wireless Systems." IEEE Transactions on Vehicular Technology 70 (2021): 12312-12324.

(Continued)

*Primary Examiner* — Fitwi Y Hailegiorgis
(74) *Attorney, Agent, or Firm* — MUNCY, GEISSLER, OLDS & LOWE, P.C.

(57) ABSTRACT

A beam domain channel modeling method for an orbital angular momentum wireless communication includes 1) establishing a geometry-based stochastic model and considering a near-field effect and a mutual coupling; 2) deriving a beam sampling matrix by utilizing a beamforming matrix, and establishing a beam domain channel model under a spatial multiplexing; and 3) implementing a simulation channel model based on a channel transfer function, and deriving and analyzing channel statistical properties. The beam domain channel model for the orbital angular momentum wireless communication established in the present disclosure is an extension of the channel models based on the plane wave, which considers the near-field effect and the mutual coupling, supports the spatial multiplexing, enriches the modeling methods for the orbital angular momentum channel in the non-line-of-sight scenarios, and is reduced in computation complexity compared with the geometry-based stochastic model.

5 Claims, 6 Drawing Sheets

(58) Field of Classification Search
USPC .......................................................... 375/262
See application file for complete search history.

(56) References Cited

OTHER PUBLICATIONS

Ji, Wenxie et al. “A Novel Beam Domain Channel Model for Orbital Angular Momentum Communication Systems with Massive Uniform Circular Array.” 2023 IEEE 97th Vehicular Technology Conference (VTC2023-Spring) (2023): 1-5.
He, Yubei et al. “A Novel 3-D Beam Domain Channel Model for Maritime Massive MIMO Communication Systems Using Uniform Circular Arrays.” IEEE Transactions on Communications 71 (2023): 2487-2502.

* cited by examiner

BEAM DOMAIN CHANNEL MODELING METHOD FOR ORBITAL ANGULAR MOMENTUM WIRELESS COMMUNICATION

TECHNICAL FIELD

The present disclosure belongs to the field of channel modeling, and in particular relates to a beam domain channel modeling method for an orbital angular momentum (OAM) wireless communication.

BACKGROUND

In the sixth generation (6G) of the mobile communications, the spatial domain is further explored. The spatial mode multiplexing (SMM) is a promising multiplexing technology that can achieve the performance requirements of the wider coverage and the higher rate. The spatial multiplexing and the OAM multiplexing are the commonly used spatial mode multiplexing methods. In the direct illuminated scenarios, the feasibility of the OAM multiplexing has been proven (200 Gb/s Wireless Transmission Using Dual-polarized OAM-MIMO Multiplexing with Uniform Circular Array on 28 GHz Band). In the non-line-of-sight scenarios, the multipath effect affects the purity of the OAM mode and affects the demultiplexing of the OAM. Therefore, in the multipath scenario, the OAM multiplexing is required to be converted into the spatial multiplexing. At present, the results related to the OAM channel modeling in the spatial multiplexing is few. However, the channel modeling and the characteristics analysis are crucial to the design and the performance evaluation on the communication system, which is urgently to be researched furtherly.

At present, the OAM channel modeling in the spatial multiplexing is mainly concentrated in the double-ended uniform linear array (ULA) scenario, and the modeling method utilized for the OAM channel modeling is the geometry-based stochastic modeling method. The relevant literature focuses on analyzing the influences of the parameters such as the angular spread and the angle of beam divergence on the channel capacity (A Revisit of Orbital Angular Momentum Multiplexing in Multipath Environment), the influences of the OAM mode values on the spatial cross-correlation function, and further analyzing the multiplexing capability (A Novel 3D Wideband Time-varying Channel Model for Orbital Angular Momentum Communication Systems).

The beam domain channel modeling describes the channel from the perspective of the beam domain, which can more intuitively demonstrate the spatial multiplexing capability of the channel. The uniform circular array (UCA) is another typical antenna array topological structure except the ULA. Secondly, as the size of the antenna increases and the spacing between the antennas decreases, the near-field effect and the mutual coupling cannot be ignored. There is no beam domain channel model (BDCM) based on UCA that considers the near-field effects and the mutual spatial multiplexing at present.

In summary, it is extremely necessary to establish a UCA-based BDCM that considers the near-field effect and the mutual coupling under the spatial multiplexing at present.

SUMMARY

In view of this, the objectives of the present disclosure are to provide a beam domain channel modeling method for an OAM wireless communication, so as to establish a UCA-based beam domain channel model considering the near-field effect and the coupling under the spatial multiplexing in the non-line-of-sight scenario.

In order to achieve the above objectives, the following technical solutions are adopted in the present disclosure.

Provided is a beam domain channel modeling method for an OAM wireless communication, the method comprises following steps.

In Step S1, a three-dimensional time-varying twin-cluster environment is generated and a geometry-based stochastic model (GBSM) is established, the step specifically includes determinations of an application scenario, and angle derivations, distance parameters, steering vectors, and a mutual coupling matrix for cluster and scatterers.

In Step S2, a BDCM is established by utilizing a beamforming matrix, the step specifically includes a derivation of the beam sampling matrix, and an establishing of a time-varying channel matrix.

In Step S3, a space-time-frequency correlation function is calculated and obtained according to the time-varying channel matrix transmission matrix established in Step S2 to analyze statistical properties of the channel.

Preferably, Step S1 specifically includes following steps.

In Step S101, the geometry-based stochastic modeling method is utilized to generate the three-dimensional time-varying twin-cluster channel environment, and the application scenario is first determined, then a frequency band, antenna parameters, and simulation time are determined according to the determined application scenario. A twin-cluster channel model is adopted, a uniform circular array (UCA) is adopted for transmitting antennas, and a uniform linear array (ULA) is adopted for the receiving antennas.

In Step S102, positions of the clusters are generated. A method for generating the clusters at transmitter is same as a method for generating the clusters at receiver. The generation of the clusters at transmitter is taken as an example, the cluster distance, the azimuth angle and the elevation angle obey the following distribution:

$$\bar{d} \sim N(u, \sigma),$$

$$\bar{\phi}_A = ASA * N(0, 1) + \beta_A^T,$$

$$\bar{\phi}_E = ESA * N(0, 1) + \beta_E^T,$$

where $(\bar{d}, \bar{\phi}_A, \bar{\phi}_E)$ denotes a spherical coordinate of the cluster, $\bar{d}$ denotes the cluster distance, $\bar{\phi}_A$ denotes the azimuth angle, and $\bar{\phi}_E$ denotes the elevation angle, $N(\mu, \sigma)$ denotes a Gaussian distribution with a mean value of $\mu$ and a variance of $\sigma$, ASA and ESA denote an azimuth spread and an elevation angular spread in large scale parameters with spatial consistency in a standard document of 3GPP, $$\beta_A^T$$

denotes an azimuth angle of the placed transmitting antenna, and $$\beta_E^T$$

denotes an elevation angle of the placed transmitting antenna.

In Step S103, positions of the scatterers are generated, a scatterer distribution in the cluster is modeled as a Gaussian ellipsoid distribution, and the scatterer distribution is described through a cluster angular spread $\sigma_{AS}$, a cluster elevation spread $\sigma_{ES}$ and a cluster delay spread $\sigma_{DS}$. The scatterers are in a rectangular coordinate system with a cluster center as a coordinate origin, and a distribution probability of the scatterers located at (x', y', z') is:

$$p(x', y', z') = \frac{\exp\left(-\frac{x'^2}{2\sigma_{DS}^2} - \frac{y'^2}{2\sigma_{AS}^2} - \frac{z'^2}{2\sigma_{ES}^2}\right)}{(2\pi)^{3/2}\sigma_{DS}\sigma_{AS}\sigma_{ES}}.$$

In Step S104, a steering vector of a UCA at transmitter is generated, the steering vector is calculated based on a path difference, and the steering vector corresponding to a m-th scatter in a n-th cluster, that is, a $m_n$-th sub-path is expressed as $$a_t = \left[e^{jk\Delta d_{1,m_n}^T}, e^{jk\Delta d_{2,m_n}^T}, \ldots, e^{jk\Delta d_{M_T,m_n}^T}\right],$$

where k denotes a wave number, $M_T$ denotes a number of the antennas at transmitter, $$\Delta d_{p,m_n}^T$$

denotes the path difference of a p-th antenna, and is expressed as $$\Delta d_{p,m_n}^T = d_{m_n}^T - \sqrt{r_t^2 + d_{m_n}^{T^2} - 2r_t d_{m_n}^T \cos\left(\Phi_{p,m_n}^T\right)},$$

where $r_t$ denotes an radius of the UCA, $$\Phi_{p,m_n}^T$$

denotes a departure angle between the scatterer and the p-th antenna, expressed as $$\cos\left(\Phi_{p,m_n}^T\right) = \cos\left(\phi_{E,m_n}^T\right)\cos\left(2\pi\frac{p-1}{M_T} + \beta_A^T - \phi_{A,m_n}^T\right), \phi_{E,m_n}^T$$

denotes an elevation angle of the m-th scatterer in the n-th cluster, $$\phi_{A,m_n}^T$$

denotes an azimuth angle of the m-th scatterer in n-th cluster, and p denotes an antenna serial number. In the condition of the far-field, the above mentioned path difference can be simplified as $$\Delta d_{p,m_n}^T \approx r_t\cos\left(\Phi_{p,m_n}^T\right),$$

and in the condition of the near-field, the above mentioned expression for the path difference can be expressed as $$\Delta d_{p,m_n}^T \approx r_t\cos\left(\Phi_{p,m_n}^T\right) - \frac{r_t^2}{2d_{m_n}^T}.$$

In Step S105, a steering vector of a ULA at receiver is generated, and under the condition of the far-field, a plane wave model is adopted, at this time, a steering vector corresponding to the m-th scatterer in the n-th cluster, that is, the $m_n$-th sub-path is specifically expressed as $$a_r = \left[1, e^{j2\pi\Psi_{1,m_n}^R}, \ldots, e^{j2\pi(M_R-1)\Psi_{1,m_n}^R}\right],$$

where $M_R$ denotes a number of the antennas at receiver, and $$\Psi_{1,m_n}^R$$

denotes an arrival angle between the scatter and the antenna unit, and is expressed as $$\cos\left(\Psi_{1,m_n}^R\right) = \frac{\delta^R}{\lambda}\left[\cos\left(\beta_E^R\right)\cos\left(\phi_{E,m_n}^R\right)\cos\left(\beta_A^R - \phi_{A,m_n}^R\right) + \sin\left(\beta_E^R\right)\sin\left(\phi_{E,m_n}^R\right)\right],$$

where $\lambda$ denotes the wavelength, $\delta^R$ denotes the spacing between the transmitting antennas, $$\beta_A^T$$

denotes the azimuth angle of the placed transmitting antenna, and $$\beta_E^T$$

denotes the elevation angle of the placed transmitting antenna, $$\phi_{E,m_n}^R$$

denotes the elevation angle of the m-th scatterer in the n-th cluster, and $$\phi_{A,m_n}^T$$

denotes the azimuth angle of the m-th scatterer in the n-th cluster.

In Step S106, a mutual coupling matrix element $C_{uv}$ expresses a mutual coupling coefficient between a u-th antenna and a v-th antenna, which can be obtained through an antenna simulation software or a theoretical derivation. The mutual coupling coefficient is merely related to a number of the antenna spacings in the ULA, which can be simplified as $C_{uv}=c_{|u-v|}$.

In Step S107, a geometric random channel matrix is generated, which is expressed as $$H=\sum_{n=1}^{N}\sum_{m=1}^{M_n} C_r a_r^H \beta_{m_n} e^{j[2\pi(v_{m_n}t-f\tau_{m_n})+\Phi_{m_n}]} a_t C_t,$$

where $\{\bullet\}^H$ denotes a conjugate transposition, $C_t$ denotes a mutual coupling matrix at transmitter, $C_r$ denotes a mutual coupling matrix at receiver, $\beta_{m_n}$ denotes an amplitude of the m-th scatterer in the n-th cluster, $v_{m_n}$ denotes a Doppler frequency offset of the m-th scatterer in the n-th cluster, $\tau_{m_n}$ denotes a delay of the m-th scatterer in the n-th cluster, $\Phi_{m_n}$ denotes a random phase of the m-th scatterer in the n-th cluster, and $\Phi_{m_n}$ obeys a uniform distribution of $(0,2\pi]$.

Preferably, Step S2 specifically includes following steps.

In Step S201, a beam sampling matrix at transmitter is generated, and a frequency invariant beamforming matrix is adopted at the transmitter, which is expressed as $U_{UCA}=J\tilde{U}$, where J denotes a Bessel function compensation matrix, $\tilde{U}$ denotes a Discrete Fourier Transformation (DFT) beamforming matrix. Assuming that the antenna spacing at transmitter is a half-wavelength, the mutual coupling matrix is degenerated to a unit matrix, the beam sampling matrix at transmitter is expressed as $G_t=a_t U_{UCA}$, and under the condition of the near-field, a p-th element $g_t$ of $G_t$ is expressed as $$g_t=\begin{cases} f\left(\frac{\theta}{2}-\pi\tilde{\theta}_p\right), & \text{far field} \\ e^{-jk\frac{r_t^2}{2d_{m_n}^T}} f\left(\frac{\theta}{2}-\pi\tilde{\theta}_p\right), & \text{near field} \end{cases},$$

where $\theta$ is calculated by a formula of $$\theta=\beta_A^T-\phi_{A,m_n}^T,\ f(x)$$

is calculated by a formula of $$f(x)=e^{-j(M_T-1)x}\frac{\sin(M_T x)}{\sin x}.$$

In Step S202, the beam sampling matrix at receiver is generated, and the DFT beamforming matrix $\tilde{U}$ is adopted at the receiver. The beam sampling matrix at receiver considering the mutual coupling is expressed as $G_r=a_r C_r \tilde{U}$, and the p-th element $g_r$ of $G_r$ can be expressed as $$g_r=\sum_{u=1}^{M_R}\sum_{v=1}^{M_R} e^{j2\pi(u-1)\Psi_{1,m_n}^R} c_{|u-v|} e^{-j2\pi(v-1)\tilde{\theta}_p}.$$

In Step S203, an expression for the time-varying channel transmission matrix is $$H_B=\sum_{n=1}^{N}\sum_{m=1}^{M_n} G_r^H \beta_{m_n} e^{j[2\pi(v_{m_n}t-f\tau_{m_n})+\Phi_{m_n}]} G_t,$$

where $H_B=[H_{B,qp}(t,f)]_{M_R\times M_T}$ denotes a beam domain channel matrix, $H_{B,qp}(t,f)$ denotes a channel transfer function between a p-th transmitting beam and a q-th receiving beam, $M_R$ denotes a number of the receiving beams, and $M_T$ denotes a number of the transmitting beams.

Preferably, based on the above obtained time-varying channel transfer function, the space-time-frequency correlation function is calculated by a formula of $$R_{qp,\tilde{q}\tilde{p}}(t,f;\Delta r,\Delta t,\Delta f)=E\{H_{B,qp}(t,f)H_{B,\tilde{q}\tilde{p}}^*(t-\Delta t,f-\Delta f)\},$$

where $E\{\bullet\}$ denotes an expectation, $\{\bullet\}^T$ denotes a conjugate, when $\Delta f=0$, $p=\tilde{p}$, $q=\tilde{q}$, the space-time-frequency correlation function is simplified as a temporal autocorrelation function.

The beneficial effects for the present disclosure are as follows.

The present disclosure can describe the OAM wireless communication channel under the spatial multiplexing, which includes the near-field effect and the coupling, and compared with the existing channel model, the present disclosure has higher accuracy and generality, and can be applied to the scenario of the antenna array with more antennas and smaller antenna spacing. The channel characteristic of the OAM channel in the non-line-of-sight scenario is analyzed, which enriches the statistical properties of the current OAM channel model. Compared with the GBSM, the BDCM proposed by the present disclosure has a lower computational complexity.

DETAILED DESCRIPTION OF THE EMBODIMENT

Figure 1:
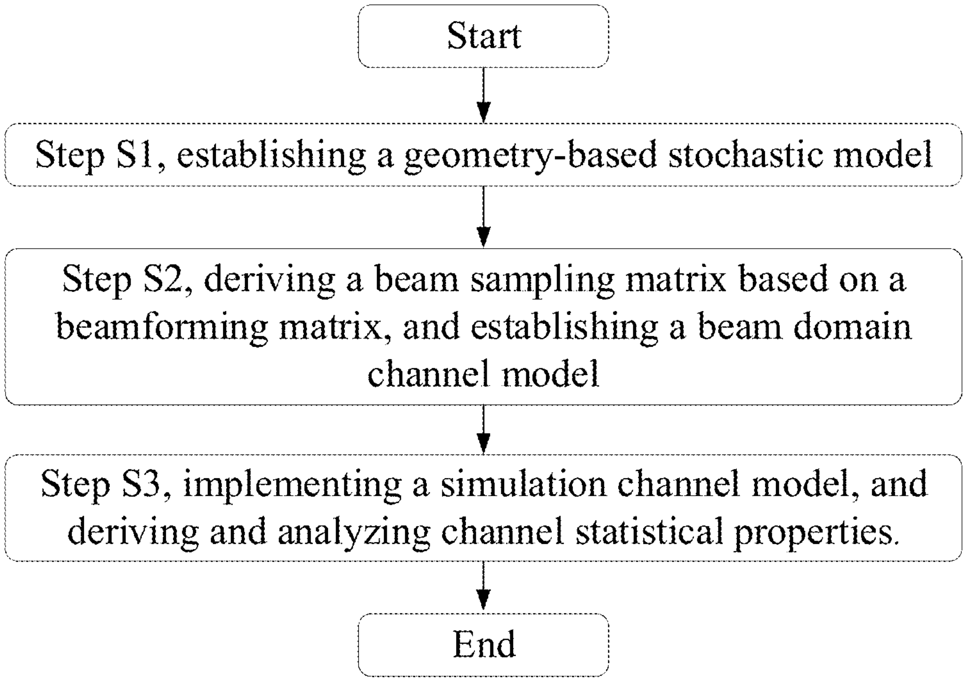
FIG. 1 illustrates a schematic flow chart of a beam domain channel modeling method for an OAM wireless communication in a spatial multiplexing provided in Embodiment 1.
Figure 2:
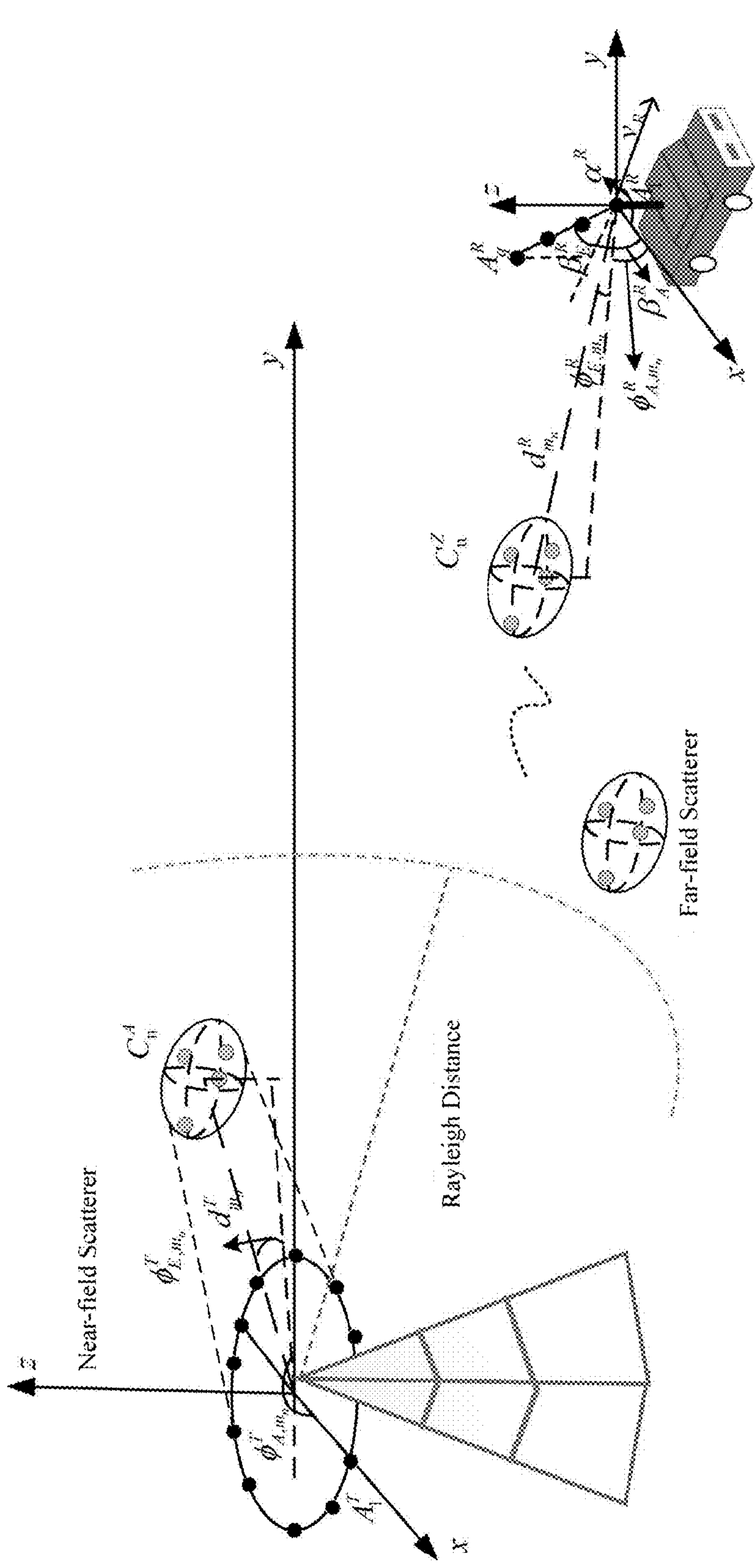
FIG. 2 illustrates a schematic diagram of a channel model in a typical cellular communication system provided in Embodiment 1.

In order to make the objectives, the technical solutions and the advantages of the embodiments of the present disclosure clearer, the technical solutions in the embodiments of the present disclosure will be clearly and completely described below with reference to the drawings in the embodiments of the present disclosure. It will be apparent that the described embodiments are merely one part of the embodiments of the present disclosure, but not all of the embodiments. Based on the embodiments of the present disclosure, all other embodiments obtained by those of ordinary skill in the art without any creative efforts shall fall within the protection scope of the present disclosure.

Embodiment 1

As illustrated in FIGS. 1 to 5, a beam domain channel modeling method for an OAM wireless communication is provided in this embodiment. The channel modeling method includes the following steps.

In Step S101, an application scenario is first determined by utilizing a geometry-based stochastic modeling method, and then a frequency band, antenna parameters, and simulation time are determined based on the determined application scenario. A twin-cluster channel model is adopted, a UCA is adopted for transmitting antennas, and a ULA is adopted for the receiving antennas.

Specifically, the application scenario is first determined as a urban macro (UMi), and it is determined that, a distance between the base station and the user is 200 m, and a system frequency is 28 GHz, the transmitting antennas are the ULA with a number of 128 antenna units and an antenna spacing of a half-wavelength, and the receiving antennas are the UCA with a number of 16 antenna units and an antenna spacing of a quarter-wavelength, and the antenna units are the omnidirectional antennas. The base station is fixed, and the motion velocity of the user is 10 m/s, the motion direction is a direction of the elevation angle of 0 and azimuth angle of $$\frac{\pi}{10}.$$

In Step S102, the positions of the clusters are generated. The method for generating the clusters at transmitter is same as the method for generating the clusters at receiver. The generation of the clusters at transmitter is taken as an example, the cluster distance, the azimuth angle and the elevation angle obey the following distribution:

$$\overline{d} \sim N(u, \sigma),$$

$$\overline{\phi}_A = ASA * N(0,1) + \beta_A^T,$$

$$\overline{\phi}_E = ESA * N(0,1) + \beta_E^T,$$

where $(\overline{d}, \overline{\phi}_A, \overline{\phi}_E)$ denotes a spherical coordinate of the cluster, $\overline{d}$ denotes the cluster distance, $\overline{\phi}_A$ denotes the azimuth angle, and $\overline{\phi}_E$ denotes the elevation angle, $N(\mu, \sigma)$ denotes a Gaussian distribution with a mean value of $\mu$ and a variance of $\sigma$, ASA and ESA denote an azimuth spread and an elevation angular spread in large scale parameters with spatial consistency in the standard document of 3GPP, $$\beta_A^T$$

denotes an azimuth angle of the placed transmitting antenna, and $$\beta_E^T$$

denotes an elevation angle of the placed transmitting antenna.

In Step S103, the positions of the scatterers are generated, the scatterer distribution in the cluster is modeled as a Gaussian ellipsoid distribution, and the scatter distribution is described through the cluster angular spread $\sigma_{AS}$, the cluster elevation spread $\sigma_{ES}$, and the cluster delay spread $\sigma_{DS}$, and the scatterers are in the rectangular coordinate system with the cluster center as the coordinate origin, and the distribution probability of the scatter located at (x', y', z') is as follows:

$$p(x', y', z') = \frac{\exp\left(-\frac{x'^2}{2\sigma_{DS}^2} - \frac{y'^2}{2\sigma_{AS}^2} - \frac{z'^2}{2\sigma_{ES}^2}\right)}{(2\pi)^{3/2}\sigma_{DS}\sigma_{AS}\sigma_{ES}}.$$

In Step S104, the steering vector of the UCA at transmitter is generated, and the steering vector is calculated based on the path difference, and the steering vector corresponding to a m-th scatter in a n-th cluster, that is, a $m_n$-th sub-path is expressed as:

$$a_t = \left[e^{jk\Delta d_{1,m_n}^T}, e^{jk\Delta d_{2,m_n}^T}, \ldots, e^{jk\Delta d_{M_T,m_n}^T}\right],$$

where k denotes a wave number, $M_T$ denotes a number of the antennas at transmitter, $$\Delta d_{p,m_n}^T$$

denotes the path difference of a p-th antenna, and is expressed as $$\Delta d_{p,m_n}^T = d_{m_n}^T - \sqrt{r_t^2 + d_{m_n}^{T^2} - 2r_t d_{m_n}^T \cos(\Phi_{p,m_n}^T)},$$

where $r_t$ denotes an radius of the UCA, $$\Phi_{p,m_n}^T$$

denotes a departure angle between the scatterer and the p-th antenna, expressed as $$\cos(\Phi_{p,m_n}^T) = \cos(\phi_{E,m_n}^T)\cos\left(2\pi\frac{p-1}{M_T} + \beta_A^T - \phi_{A,m_n}^T\right), \phi_{E,m_n}^T$$

denotes an elevation angle of the m-th scatterer in the n-th cluster, $$\phi_{A,m_n}^T$$

denotes an azimuth angle of the m-th scatterer in n-th cluster, and p denotes an antenna serial number. In the condition of the far-field, the above mentioned path difference can be simplified as $$\Delta d_{p,m_n}^T \approx r_t \cos(\Phi_{p,m_n}^T),$$

and in the condition of the near-field, the above mentioned expression for the path difference can be expressed as $$\Delta d_{p,m_n}^T \approx r_t \cos(\Phi_{p,m_n}^T) - \frac{r_t^2}{2d_{m_n}^T}.$$

In Step S105, the steering vector of a ULA at receiver is generated, and under the condition of the far-field, a plane wave model is adopted, at this time, the steering vector corresponding to the m-th scatterer in the n-th cluster, that is, the $m_n$-th sub-path is specifically expressed as $$a_r = \left[1, e^{j2\pi\Psi_{1,m_n}^R}, \dots, e^{j2\pi(M_R-1)\Psi_{1,m_n}^R}\right],$$

where $M_R$ denotes a number of the antennas at receiver, and $$\Psi_{1,m_n}^R$$

denotes an arrival angle between the scatter and the antenna unit, and is expressed as $$\cos(\Psi_{1,m_n}^R) = \frac{\delta^R}{\lambda}\left[\cos(\beta_E^R)\cos(\phi_{E,m_n}^R)\cos(\beta_A^R - \phi_{A,m_n}^R) + \sin(\beta_E^R)\sin(\phi_{E,m_n}^R)\right],$$

where $\lambda$ denotes a wavelength, $\delta^R$ denotes a spacing between the transmitting antennas, $$\beta_A^T$$

denotes an azimuth angle of the placed transmitting antenna, and $$\beta_E^T$$

denotes an elevation angle of the placed transmitting antenna, $$\phi_{E,m_n}^R$$

denotes the elevation angle of the m-th scatterer in the n-th cluster, and $$\phi_{A,m_n}^T$$

denotes the azimuth angle of the m-th scatterer in the n-th cluster.

In Step S106, the mutual coupling matrix element $C_{uv}$ expresses the mutual coupling coefficient between the u-th antenna and the v-th antenna, which can be obtained through the antenna simulation software or the theoretical derivation. The mutual coupling coefficient is merely related to a number of the antenna spacings in the ULA, which can be simplified as $C_{uv}=c_{|u-v|}$.

In Step S107, the geometric random channel matrix is generated, which is expressed as $$H = \sum_{n=1}^{N}\sum_{m=1}^{M_n} C_r a_r^H \beta_{m_n} e^{j\left[2\pi(v_{m_n}t - f\tau_{m_n}) + \Phi_{m_n}\right]} a_t C_t,$$

where $\{\bullet\}^H$ denotes a conjugate transposition, $C_t$ denotes a mutual coupling matrix at transmitter, $C_r$ denotes a mutual coupling matrix at receiver, $\beta_{m_n}$ denotes an amplitude of the m-th scatterer in the n-th cluster, $v_{m_n}$ denotes a Doppler frequency offset of the m-th scatterer in the n-th cluster, $\tau_{m_n}$ denotes a time delay of the m-th scatterer in the n-th cluster, $\Phi_{m_n}$ denotes a random phase of the m-th scatterer in the n-th cluster, and $\Phi_{m_n}$ obeys a uniform distribution of $(0,2\pi]$.

Preferably, Step S2 specifically includes following steps.

In Step S201, the beam sampling matrix at transmitter is generated, and the frequency invariant beamforming matrix is adopted at the transmitter, which is expressed as $U_{UCA}=J\tilde{U}$, where J denotes the Bessel function compensation matrix, $\tilde{U}$ denotes the Discrete Fourier Transformation (DFT) beamforming matrix. Assuming that the antenna spacing at transmitter is a half-wavelength, the mutual coupling matrix is degenerated to a unit matrix, the beam sampling matrix at transmitter is expressed as $G_t=a_tU_{UCA}$, and under the condition of the near-field, a p-th element $g_t$ of $G_t$ is expressed as $$g_t = \begin{cases} f\left(\frac{\theta}{2} - \pi\tilde{\theta}_p\right), & \text{far field} \\ e^{-jk\frac{r_t^2}{2d_{m_n}^T}} f\left(\frac{\theta}{2} - \pi\tilde{\theta}_p\right), & \text{near field} \end{cases},$$

where $\theta$ is calculated by a formula of $$\theta = \beta_A^T - \phi_{A,m_n}^T,\ f(x)$$

is calculated by a formula of $$f(x) = e^{-j(M_T-1)x}\frac{\sin(M_T x)}{\sin x}.$$

In Step S202, the beam sampling matrix at receiver is generated, and the DFT beamforming matrix $\tilde{U}$ is adopted at the receiver. The beam sampling matrix at receiver considering the mutual coupling is expressed as $G_r=a_rC_r\tilde{U}$, and the p-th element $g_r$ of $G_r$ can be expressed as $$g_r = \sum_{u=1}^{M_R}\sum_{v=1}^{M_R} e^{j2\pi(u-1)\Psi_{1,m_n}^R} c_{|u-v|} e^{-j2\pi(v-1)\tilde{\theta}_p}.$$

In Step S203, an expression for the time-varying channel transmission matrix is $$H_B=\sum_{n=1}^{N}\sum_{m=1}^{M_n}G_r^H\beta_{m_n}e^{j[2\pi(\nu_{m_n}t-f\tau_{m_n})+\Phi_{m_n}]}G_t,$$

where $H_B=[H_{B,qp}(t, f)]_{M_R\times M_T}$ denotes a beam domain channel matrix, $H_{B,qp}(t, f)$ denotes a channel transfer function between a p-th transmitting beam and a q-th receiving beam, $M_R$ denotes a number of the receiving beams, and $M_T$ denotes a number of the transmitting beams.

Preferably, based on the above obtained time-varying channel transfer function, the space-time-frequency correlation function is calculated by a formula of $$R_{qp,\tilde{q}\tilde{p}}(t, f; \Delta r, \Delta t, \Delta f)=E\{H_{B,qp}(t, f)\,H^*_{B,\tilde{q}\tilde{p}}(t-\Delta t, f-\Delta f)\},$$

where E{•} denotes an expectation, $\{\bullet\}^T$ denotes an transposition, when Δf=0, p=p̃, q=q̃, the space-time-frequency correlation function is simplified as a temporal autocorrelation function.

In order to verify the correctness of the method provided in this embodiment, the experiments are performed, which is specifically as follows.

Figure 3A:
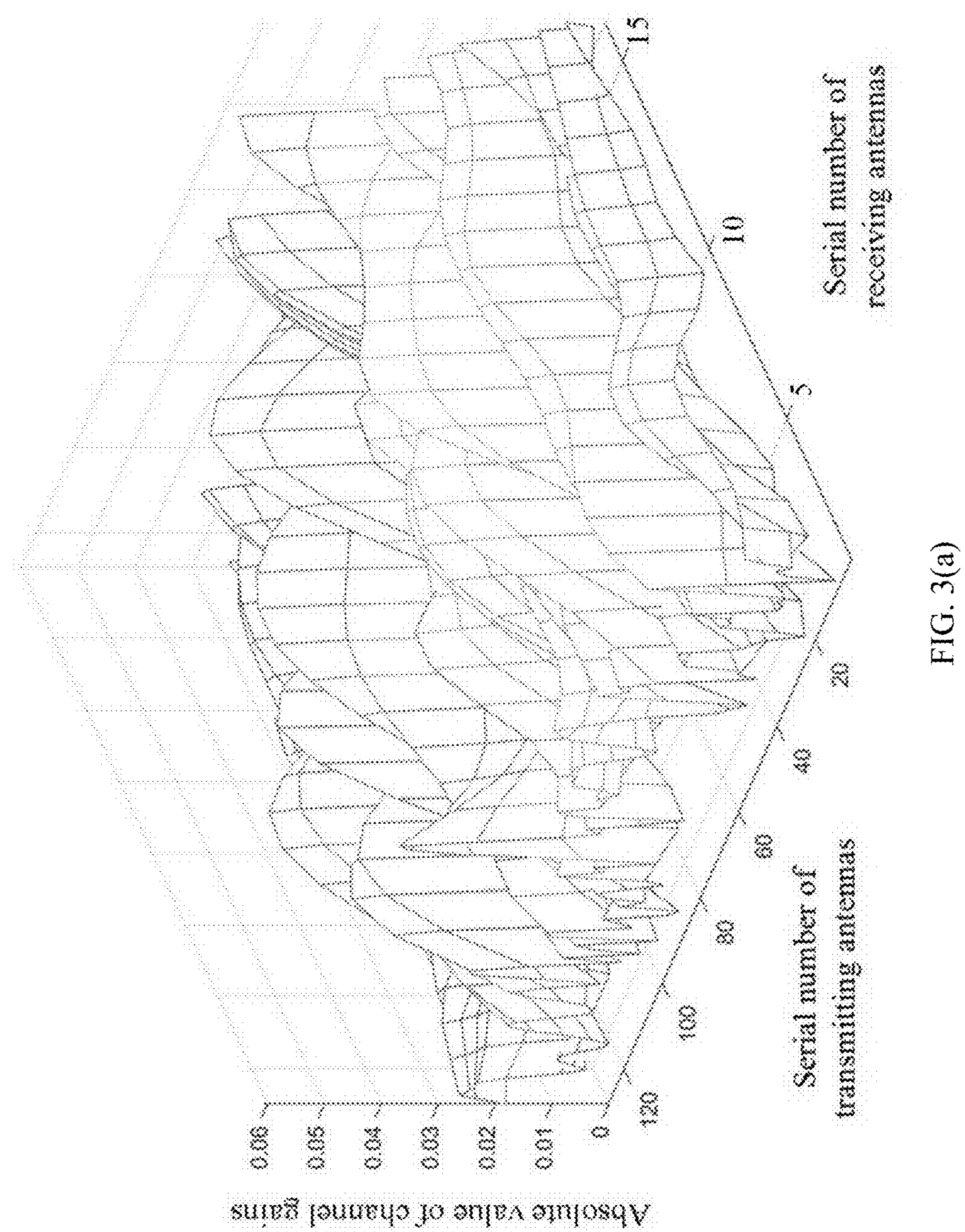
FIG. 3(*a*) illustrates a schematic diagram of a simulation result for a channel matrix of a GBSM provided in Embodiment 1, and FIG. 3(*b*) illustrates a schematic diagram of a simulation result for a channel matrix of a BDCM provided in Embodiment 1.
Figure 3B:
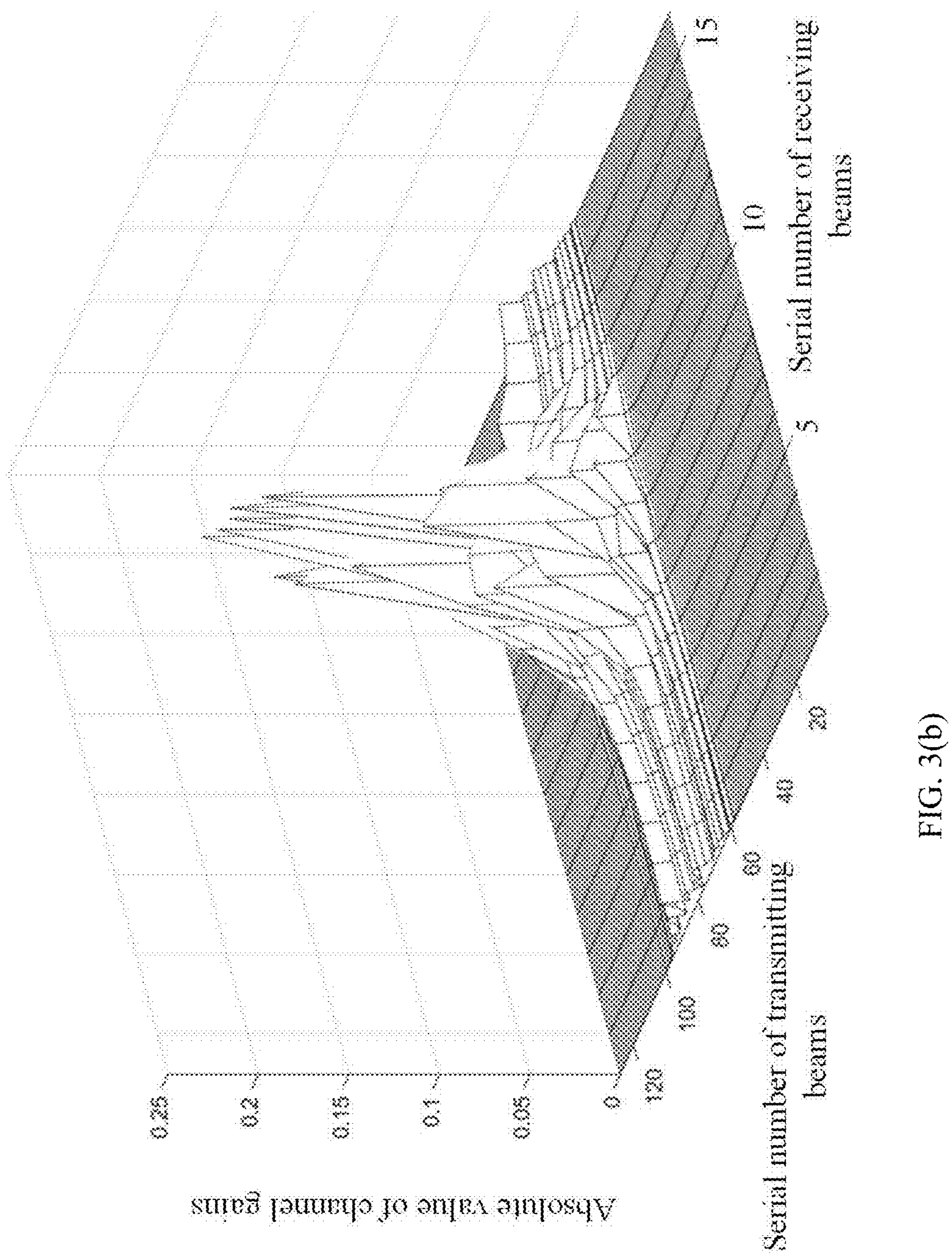

The channel matrix of the GBSM is compared with the channel matrix of the BDCM, and the results are as illustrated in FIG. 3. The relevant parameters are set that the elevation angle of the transmitting antenna is $$\beta_A^T=\frac{\pi}{3},$$

the azimuth angle of the transmitting antenna is $$\beta_E^T=0,$$

the elevation angle of the receiving antenna is $$\beta_A^R=\frac{\pi}{4},$$

and the azimuth angle of the receiving antenna is $$\beta_E^T=\frac{\pi}{3}.$$

Compared with the GBSM, the BDCM can utilize the sparse characteristic of the channel to effectively reduce the complexity. Secondly, the physical explanation can be performed clearer, and more specifically, each beam pair can be regarded as an independent channel, which directly affects the channel capacity.

Figure 4:
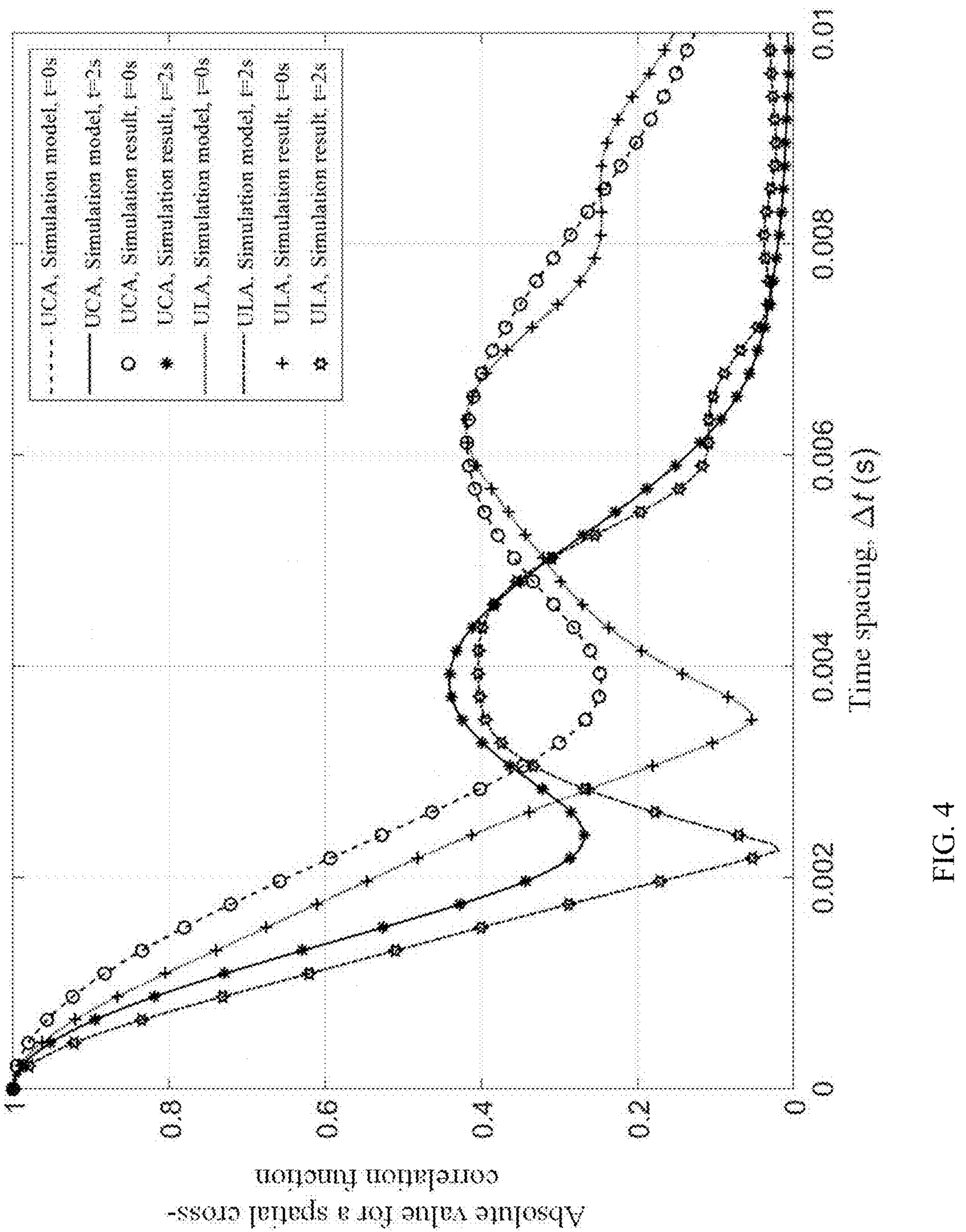
FIG. 4 illustrates a schematic diagram of a simulation result for a temporal autocorrelation function in different antenna topology structures provided in Embodiment 1.
Figure 5:
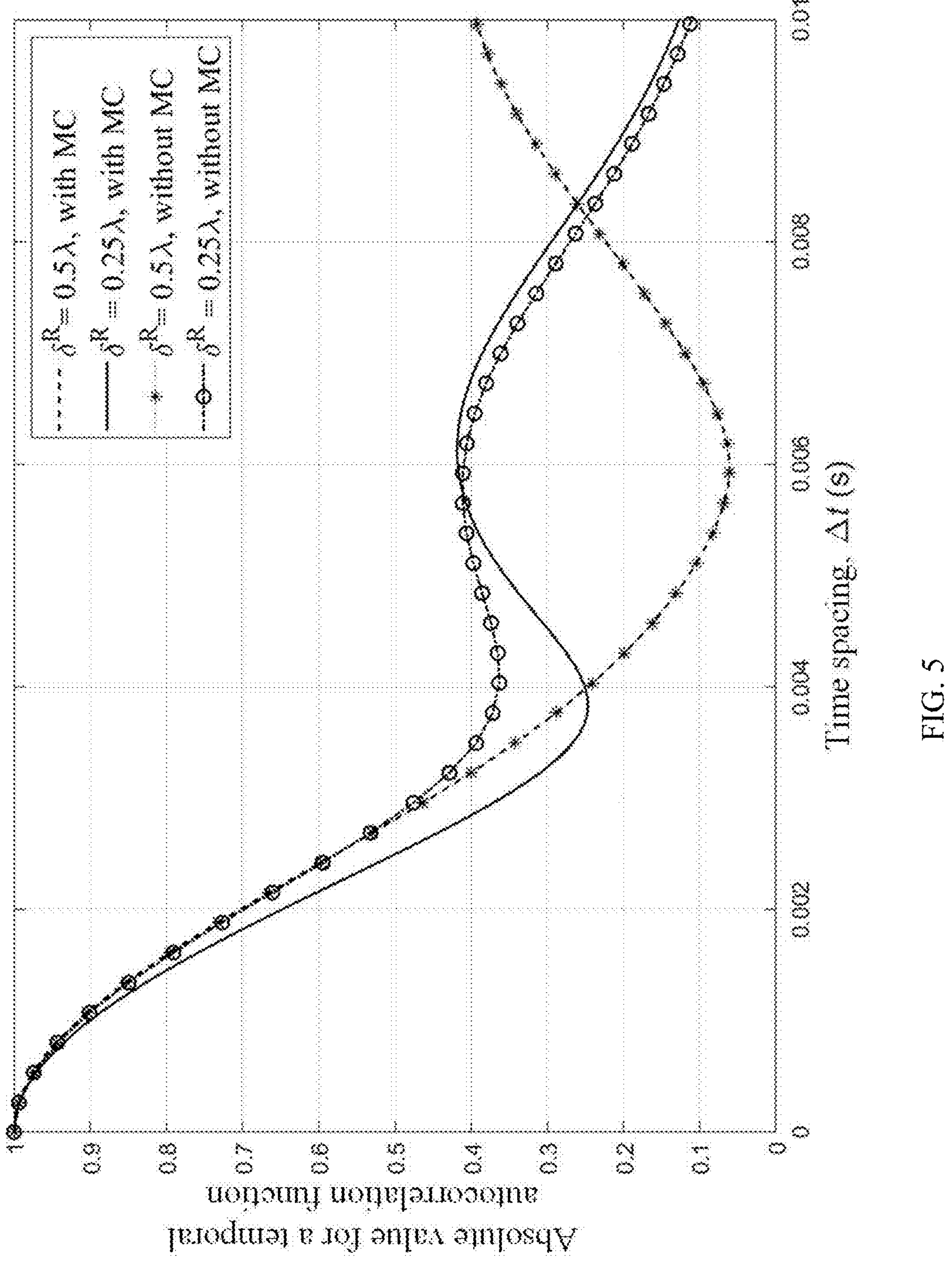
FIG. 5 illustrates a schematic diagram of a simulation result for the temporal autocorrelation function considering the mutual coupling provided in Embodiment 1.

The influences of the antenna topology structure and the mutual coupling characteristics on the channel are analyzed in terms of the time correlation, and the simulation results are as illustrated in FIG. 4 and FIG. 5. The relevant parameters are set that the elevation angle and the azimuth angle of the transceiving antennas are all 0. It can be seen from the simulation diagrams that when the simulation model coincide with the simulation result, the correctness of the model is verified. Further, by observing the time correlation function image, different antenna topology structures correspond to different antenna patterns, different sub-paths have different gains and have different effects on Doppler frequency offset, and the temporal autocorrelation function of the system exhibits different statistical properties. Secondly, different antenna spacings can result in different temporal autocorrelation functions. As the antenna spacing varies, the same scatterer may belong to different beams, which causes the temporal autocorrelation function to vary. Finally, when the antenna spacing is less than half a wavelength, the effect of the mutual coupling cannot be ignored.

To sum up, the OAM channel model established in the present disclosure is an extension of the channel model based on the plane wave, which describes the OAM wireless communication channel in the spatial multiplexing, includes the near-field effects and the mutual coupling, and analyzes the channel characteristic of the OAM channel under the non-line-of-sight scenario, and enriches the modeling method of the OAM channel under the non-line-of-sight scenario. The statistical properties of the simulation have reference value for the design of the orbital angular OAM communication system.

The contents that are not described in detail in the present disclosure is a well-known technology for those skilled in the art. The preferred embodiments of the present disclosure are described in detail above. It should be understood that those skilled in the art can make various modifications and variations based on the concept of the present disclosure without creative efforts. Therefore, all technical solutions that can be obtained by those skilled in the art through the logical analysis, the reasoning or the limited experiments in accordance with the concept of the present disclosure on the basis of the existing technology should be within the protection scope determined by the claims.

What is claimed is:

1. A beam domain channel modeling method for an orbital angular momentum (OAM) wireless communication, comprising following steps:

Step S1, generating a three-dimensional time-varying twin-cluster environment and establishing a geometry-based stochastic model (GBSM), specifically including determining an application scenario; and deriving angles, distance parameters, steering vectors, and a mutual coupling matrix of cluster and scatterers;

Step S2, establishing, by utilizing a beamforming matrix, a beam domain channel model (BDCM), specifically including establishing a beam sampling matrix and a time-varying channel matrix; and Step S3, calculating and obtaining, according to the time-varying channel matrix transmission matrix established in Step S2, a space-time-frequency correlation function.

2. The beam domain channel modeling method for the OAM wireless communication according to claim 1, wherein Step S1 specifically includes:

Step S101, first determining the application scenario; then determining, according to the determined application scenario, a frequency band, antenna parameters, and simulation time, wherein a twin-cluster channel model is adopted, a uniform circular array (UCA) is adopted for transmitting antennas, and a uniform linear array (ULA) is adopted for receiving antennas;

Step S102, generating positions of the clusters, wherein a method for generating the clusters at transmitter is same as a method for generating the clusters at receiver, a cluster distance, an azimuth angle, and an elevation angle obey a Gaussian distribution, and are related to an azimuth spread and an elevation spread in large scale parameters with spatial consistency in a standard document of 3GPP as well as an azimuth angle $$\beta_A^T$$

of a placed antenna and an elevation angle $$\beta_E^T$$

of the placed antenna;

Step S103, generating positions of the scatterers, modeling a scatterer distribution in the cluster as a Gaussian ellipsoid distribution, and describing, through a cluster angular spread $\sigma_{AS}$, a cluster elevation spread $\sigma_{ES}$ and a cluster delay spread $\sigma_{DS}$, the scatterer distribution, wherein the scatterers are in a rectangular coordinate system with a cluster center as a coordinate origin, and a distribution probability of the scatterers located at (x', y', z') is:

$$p(x', y', z') = \frac{\exp\left(-\frac{x'^2}{2\sigma_{DS}^2} - \frac{y'^2}{2\sigma_{AS}^2} - \frac{z'^2}{2\sigma_{ES}^2}\right)}{(2\pi)^{3/2}\sigma_{DS}\sigma_{AS}\sigma_{ES}};$$

Step S104, generating a steering vector of a UCA at transmitter, wherein the steering vector is calculated based on a path difference, and the steering vector corresponding to a m-th scatter in a n-th cluster, that is, a $m_n$-th sub-path is expressed as $$a_t = \left[e^{jk\Delta d_{1,m_n}^T}, e^{jk\Delta d_{2,m_n}^T}, \ldots, e^{jk\Delta d_{M_T,m_n}^T}\right],$$

where k denotes a wave number, $M_T$ denotes a number of the antennas at transmitter, $$\Delta d_{p,m_n}^T$$

denotes the path difference of a p-th antenna, and is expressed as $$\Delta d_{p,m_n}^T = d_{m_n}^T - \sqrt{r_t^2 + d_{m_n}^{T2} - 2r_t d_{m_n}^T \cos(\Phi_{p,m_n}^T)},$$

where $r_t$ denotes an radius of the UCA, $$\Phi_{p,m_n}^T$$

denotes a departure angle between the scatterer and the p-th antenna, expressed as $$\cos(\Phi_{p,m_n}^T) = \cos(\phi_{E,m_n}^T)\cos\left(2\pi\frac{p-1}{M_T} + \beta_A^T - \phi_{A,m_n}^T\right), \phi_{E,m_n}^T$$

denotes an elevation angle of the m-th scatterer in the n-th cluster, $$\phi_{A,m_n}^T$$

denotes an azimuth angle of the m-th scatterer in the n-th cluster, and p denotes an antenna serial number;

Step S105, generating a steering vector of a ULA at receiver, and adopting, under a condition of a far-field, a plane wave model, wherein a steering vector corresponding to the m-th scatterer in the n-th cluster, that is, the $m_n$-th sub-path is specifically expressed as $$a_r = \left[1, e^{j2\pi\Psi_{1,m_n}^R}, \ldots, e^{j2\pi(M_R-1)\Psi_{1,m_n}^R}\right],$$

where $M_R$ denotes a number of the antennas at receiver, and $$\Psi_{1,m_n}^R$$

denotes an arrival angle between the scatter and the antenna unit, and is expressed as $$\cos(\Psi_{1,m_n}^R) = \frac{\delta^R}{\lambda}\left[\cos(\beta_E^R)\cos(\phi_{E,m_n}^R)\cos(\beta_A^R - \phi_{A,m_n}^R) + \sin(\beta_E^R)\sin(\phi_{E,m_n}^R)\right],$$

where $\lambda$ denotes a wavelength, $\delta^R$ denotes a spacing between the transmitting antennas, $$\beta_A^T$$

denotes an azimuth angle of the placed transmitting antenna, and $$\beta_E^T$$

denotes an elevation angle of the placed transmitting antenna, $$\phi_{E,m_n}^R$$

denotes the elevation angle of the m-th scatterer in the n-th cluster and $$\phi_{A,m_n}^T$$

denotes the azimuth angle of the m-th scatterer in n-th cluster;

Step S106, obtaining, through an antenna simulation software or a theoretical derivation, a mutual coupling matrix element $C_{uv}$, wherein $C_{uv}$ denotes a mutual coupling coefficient between a u-th antenna and a v-th antenna, and the mutual coupling coefficient is merely related to a number of antenna spacings in the ULA, and simplified as $$C_{uv}=c_{|u-v|};$$

and

Step S107, generating a geometric random channel matrix expressed as $$H=\sum_{n=1}^{N}\sum_{m=1}^{M_n} C_r a_r^H \beta_{m_n} e^{j\left[2\pi\left(v_{m_n}t-f\tau_{m_n}\right)+\Phi_{m_n}\right]} a_t C_t,$$

where $\{\bullet\}^H$ denotes a conjugate transposition, $C_t$ denotes a mutual coupling matrix at transmitter, $C_r$ denotes a mutual coupling matrix at receiver, $\beta_{m_n}$ denotes an amplitude of the m-th scatterer in the n-th cluster, $v_{m_n}$ denotes a Doppler frequency offset of the m-th scatterer in the n-th cluster, $\tau_{m_n}$ denotes a time delay of the m-th scatterer in the n-th cluster, $\angle_{m_n}$ denotes a random phase of the m-th scatterer in the n-th cluster, and $\Phi_{m_n}$ obeys a uniform distribution of $(0,2\pi]$, wherein $$\beta_E^R$$

denotes an elevation angle of the placed receiving antenna;

$$\beta_A^R$$

denotes an azimuth angle of the place receiving antenna; and $$\phi_{A,m_n}^R$$

denotes an azimuth angle of the m-th scatterer in n-th cluster.

3. The beam domain channel modeling method for the OAM wireless communication according to claim 2, wherein Step S2 specifically includes:

Step S201, generating a beam sampling matrix at transmitter, and adopting a frequency invariant beamforming matrix at the transmitter expressed as $U^{UCA}=J\tilde{U}$, where J denotes a Bessel function compensation matrix, $\tilde{U}$ denotes a Discrete Fourier Transformation (DFT) beamforming matrix; wherein assuming that the antenna spacing at transmitter is a half-wavelength, the mutual coupling matrix is degenerated to a unit matrix, the beam sampling matrix at transmitter is expressed as $G_t=a_tU_{UCA}$, and under a condition of the near-field, a p-th element $g_t$ of $G_t$ is expressed as $$g_t=\begin{cases} f\left(\frac{\theta}{2}-\pi\tilde{\theta}_p\right), & \text{far field} \\ r^{-jk\frac{r_t^2}{2d_{m_n}^T}} f\left(\frac{\theta}{2}-\pi\tilde{\theta}_p\right), & \text{near field} \end{cases},$$

where θ is calculated by a formula of $$\theta=\beta_A^T-\phi_{A,m_n}^T,\ f(x)$$

is calculated by a formula of $$f(x)=e^{-j(M_T-1)x}\frac{\sin(M_Tx)}{\sin x};$$

Step S202, generating a beam sampling matrix at receiver, and adopting the DFT beamforming matrix $\tilde{U}$ at the receiver, wherein the beam sampling matrix at receiver considering the mutual coupling is expressed as $G_r=a_rC_r\tilde{U}$, and the p-th element $g_r$ of $G_r$ is expressed as $$g_r=\sum_{u=1}^{M_R}\sum_{v=1}^{M_R} e^{j2\pi(u-1)\Psi_{1,m_n}^R} c_{|u-v|} e^{-j2\pi(v-1)\tilde{\theta}_p};$$

and

Step S203, expressing the time-varying channel transmission matrix as $$H_B=\sum_{n=1}^{N}\sum_{m=1}^{M_n} G_r^H \beta_{m_n} e^{j\left[2\pi\left(v_{m_n}t-f\tau_{m_n}\right)+\Phi_{m_n}\right]} G_t,$$

where $H_B=[H_{B,qp}(t,\ f)]_{M_R\times M_T}$ denotes a beam domain channel matrix, $H_{B,qp}(t,\ f)$ denotes a channel transfer function between a p-th transmitting beam and a q-th receiving beam, $M_R$ denotes a number of the receiving beams, and $M_T$ denotes a number of the transmitting beams.

4. The beam domain channel modeling method for the OAM wireless communication according to claim 3, wherein based on the time-varying channel transfer function, the space-time-frequency correlation function is calculated by a formula of $$R_{qp,\tilde{q}\tilde{p}}(t,\ f;\ \Delta r,\ \Delta t,\ \Delta f)=E\left\{H_{B,qp}(t,\ f)\,H_{B,\tilde{q}\tilde{p}}^*(t-\Delta t,\ f-\Delta f)\right\},$$

where $E\{\bullet\}$ denotes an expectation, $\{\bullet\}^T$ denotes a conjugate, when $\Delta f=0$, $p=\tilde{p}$, $q=\tilde{q}$, the space-time-frequency correlation function is simplified as a temporal autocorrelation function.

5. The beam domain channel modeling method for the OAM wireless communication according to claim 2, wherein in Step S104, under the condition of the far-field, the path difference is expressed as $$\Delta d_{p,m_n}^T\approx r_t\cos\left(\Phi_{p,m_n}^T\right),$$

and under the condition of the near-field, the path difference is expressed as $$\Delta d_{p,m_n}^T\approx r_t\cos\left(\Phi_{p,m_n}^T\right)-\frac{r_t^2}{2d_{m_n}^T}.$$

* * * * *